(12) United States Patent
Mielke

(10) Patent No.: US 7,658,004 B2
(45) Date of Patent: Feb. 9, 2010

(54) METHOD AND DEVICE FOR THE FINISH MACHINING OF GAS-TURBINE ENGINE BLADES CAST IN A BRITTLE MATERIAL

(75) Inventor: Rainer Mielke, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 262 days.

(21) Appl. No.: 11/641,838

(22) Filed: Dec. 20, 2006

(65) Prior Publication Data
US 2007/0163116 A1 Jul. 19, 2007

(30) Foreign Application Priority Data
Dec. 24, 2005 (DE) .................. 10 2005 062 303

(51) Int. Cl.
*B22C 7/02* (2006.01)
*B23B 3/28* (2006.01)

(52) U.S. Cl. ............................ 29/889.7; 82/1.11; 82/11

(58) Field of Classification Search .................. 407/48, 407/40, 53, 103, 33, 34, 64, 21; 29/889.7, 29/889; 416/223, 223 A; 82/1.11, 11, 13; 415/191, 198.1; 142/6, 7
See application file for complete search history.

(56) References Cited

U.S. PATENT DOCUMENTS

| | | | |
|---|---|---|---|
| 2,996,279 A * | 8/1961 | Lorett et al. ................. 415/110 |
| 3,258,245 A * | 6/1966 | Alderson ................. 416/196 R |
| 5,055,752 A | 10/1991 | Leistensnider |
| 5,248,240 A * | 9/1993 | Correia ..................... 415/209.1 |
| 5,869,194 A | 2/1999 | Dwyer |
| 6,179,567 B1 | 1/2001 | Stauffer |
| 6,890,248 B2 * | 5/2005 | Whitmarsh et al. ......... 451/365 |
| 7,341,427 B2 * | 3/2008 | Farmer et al. ................ 415/191 |
| 2002/0174968 A1 | 11/2002 | Mertins |
| 2005/0132570 A1 | 6/2005 | Bouchard |

FOREIGN PATENT DOCUMENTS

| | | |
|---|---|---|
| DE | 691 13 502 T2 | 10/1991 |
| DE | 43 39 069 A1 | 5/1995 |
| DE | 60015259 T2 | 2/2001 |
| EP | 0909 879 B1 | 4/1999 |
| EP | 1 543 918 A2 | 6/2005 |

* cited by examiner

*Primary Examiner*—Will Fridie, Jr.
(74) *Attorney, Agent, or Firm*—Timothy J. Klima; Shuttleworth & Ingersoll, PLC

(57) ABSTRACT

For the finish machining of turbine blades cast in titanium aluminide, the feeders (3) and runner portions (6) yielded by the casting process remain on the blade and serve as auxiliary clamping structure for clamping the blade to the workpiece carrier (15). In a position corresponding to the reference points for machining, clamping surfaces (12) with conical recesses (13), followed by threaded holes (14) are produced on the runners. For clamping the workpiece to a workpiece carrier (15), spring-loaded taper centering sleeves (18) arranged in the workpiece carrier or clamping bolts (21), respectively, engage the conical recesses and threaded holes, to enable the blade to be clamped and machined by way of the auxiliary clamping structure in the position corresponding to the reference points.

12 Claims, 3 Drawing Sheets

Figure 1:
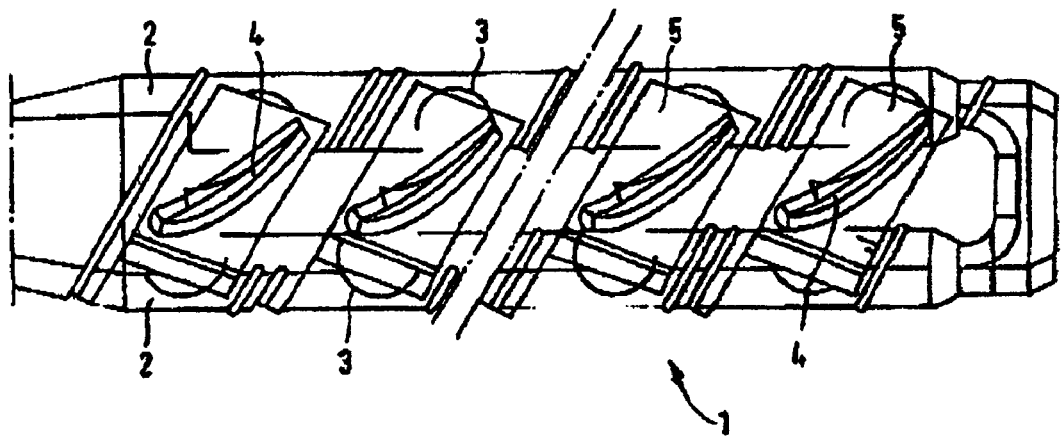

METHOD AND DEVICE FOR THE FINISH MACHINING OF GAS-TURBINE ENGINE BLADES CAST IN A BRITTLE MATERIAL

This application claims priority to German Patent Application DE 10 2005 062 303.4 filed Dec. 24, 2005, the entirety of which is incorporated by reference herein.

BACKGROUND OF THE INVENTION

This invention relates to a method for the finish machining of the blade root structure of gas-turbine engine blades cast in a brittle material, such as titanium aluminide, and to a device for employing the method, i.e. for the positioning, fixation and clamping of the workpiece.

Precision-cast blades made of titanium aluminide are characterized by low weight and appropriate thermal resistance and are, therefore, employed in engines under the aspect of maximum weight reduction. However, the material used is very brittle which is disadvantageous in that the blade cannot be conventionally clamped at the reference points (K points) on the airfoil for the required post-casting machining of the blade root geometry, as the brittle material will fail under the high forces occurring during the machining process.

In a known method, the blades made of titanium aluminide are first removed from the feeder and runner structure adhering to them upon casting. The airfoil is then positioned at the reference points specified for subsequent machining of the blade root geometry and, in this defined position, embedded in low-melting material. In this embedding material, the blade is gently held for machining its root by suitable clamping means to preclude blade fracture. However, embedding of the airfoil for clamping the blade and melting and removal of the embedding material after machining incurs considerable effort, in particular under the aspect that embedding must be accomplished with high accuracy to enable the workpiece to be machined with maximum precision on the basis of the reference points specified for finish machining.

DESCRIPTION OF THE INVENTION

A broad aspect of the present invention is to provide significant reduction of the work effort involved in the finish machining of precision-cast aircraft gas-turbine blades made of titanium aluminide.

It is a particular object of the present invention to provide solutions to the above problems by a method and a device in accordance with the characteristics described herein for the clamping of a workpiece to be machined.

The underlying idea of the present invention is that the feeders and runners adhering to the blade as a result of the casting process are not removed for the moment, but are employed as, and correspondingly transformed into, an auxiliary clamping structure enabling the blade to be clamped to a workpiece carrier. This enables the blade platform or the blade root structure, respectively, to be finish-machined without subjecting the fracture-susceptible blade airfoil to destructive forces. In addition, the clamping of the blade with, and the generation of, this auxiliary clamping structure is much easier than is the case with the clamping structure known from the state of the art where the airfoil is embedded for machining the blade root geometry and the casting structure is attached to a workpiece carrier.

In accordance with a further feature of the present invention, the blade with the feeders and runners adhering to it is initially positioned on the blade airfoil, actually with the application of minimum force to the airfoil at supporting points corresponding to the reference points for the required machining of the blade geometry, and is then fixed at the longitudinal sides of the platform. In this fixed position, a clamping surface with at least two conical recesses, each followed by a threaded hole, is produced on the runner. The auxiliary clamping structure thus provided is clamped to the clamping surface of a workpiece carrier, with moveable, axially spring-loaded taper centering sleeves protruding from the clamping surface and with the clamping bolts passing through these taper centering sleeves engaging the conical recess or the threaded hole of the auxiliary clamping structure to center or clamp the workpiece on the workpiece carrier, respectively.

The auxiliary clamping structure according to the present invention enables a plurality of workpieces to be clamped to a workpiece carrier, ultimately enabling industrial finish-machining of gas-turbine engine blades cast in a light, but brittle material, such as titanium aluminide, with lower work effort than in the state of the art.

Further useful and advantageous embodiments of the present invention will become apparent from the present description.

Figure 2:
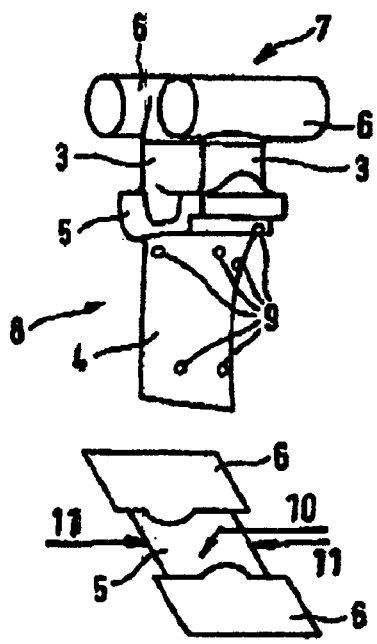
Figure 3:
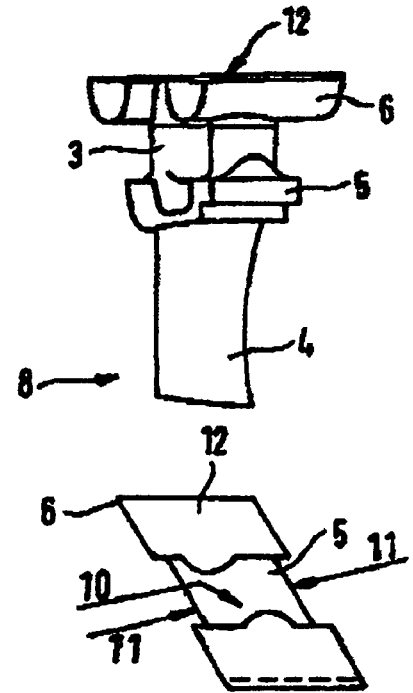
Figure 4:
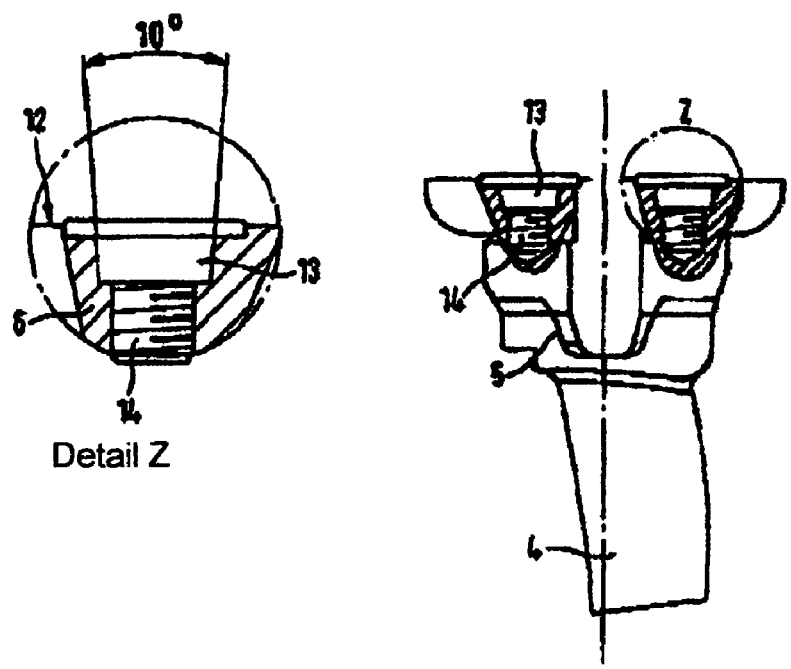
Figure 6:
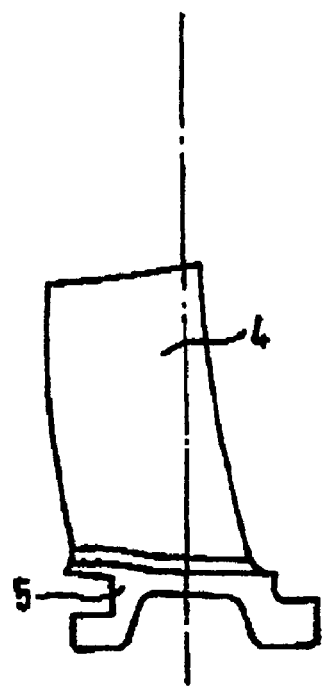
Figure 5:
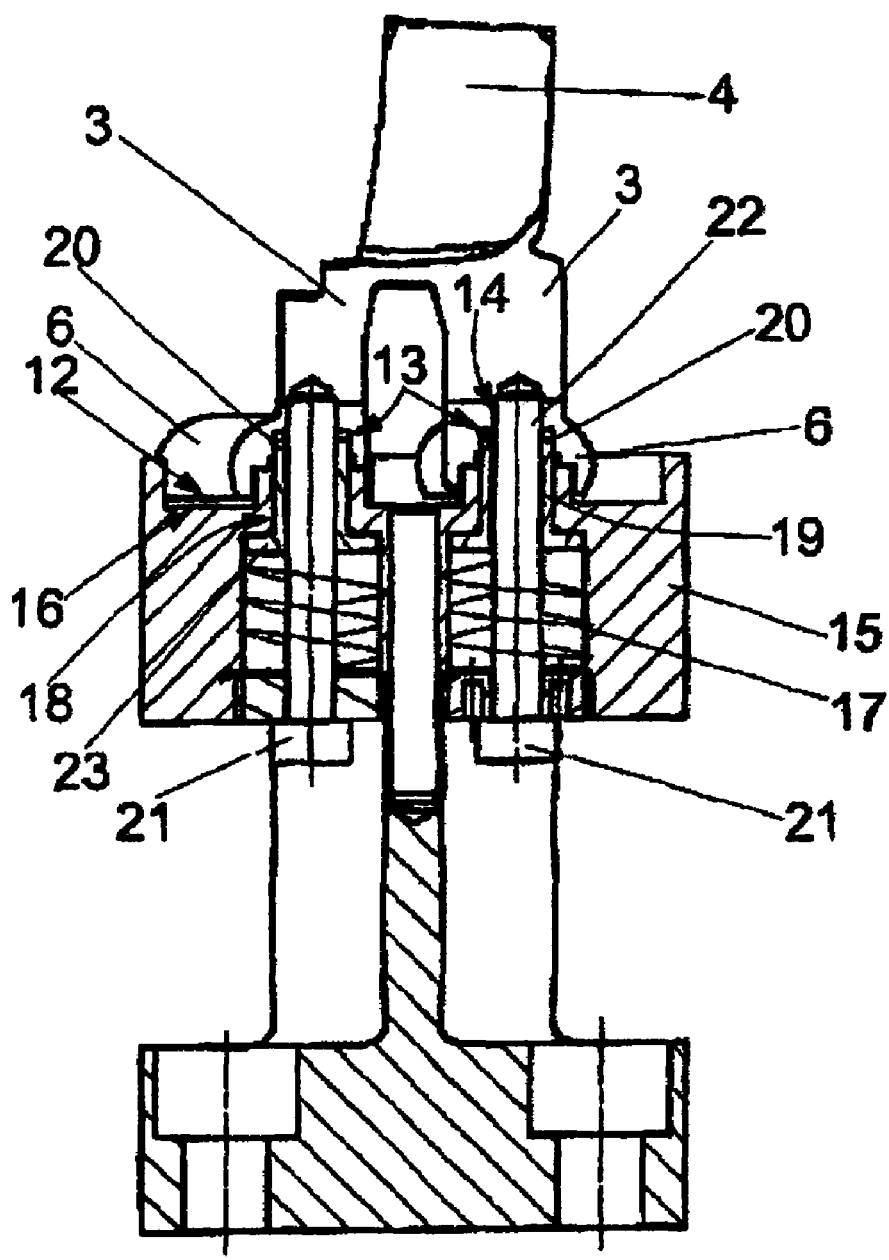

An embodiment of the present invention is more fully described in light of the accompanying drawings. In the drawings, FIG. 1 is a top view of a centrifugal casting blank after removal from the mold, with a plurality of blades adhering to feeders and runners, FIG. 2 shows a blade (workpiece) severed from the blank with remaining feeders and runner portions for an auxiliary clamping structure, FIG. 3 shows the workpiece of FIG. 2, but with runner clamping surfaces generated on both runner portions, FIG. 4 shows the workpiece of FIG. 3, but with a conical recess originating at each clamping surface, followed by a threaded hole, FIG. 5 is a partial view of the workpiece carrier and of the workpiece of FIG. 4 clamped to the workpiece carrier via an auxiliary clamping structure for finish-machining of the blade root geometry, and FIG. 6 shows the finish-machined blade made of titanium aluminide for an aircraft gas turbine.

Upon centrifugal casting and removal from the mold, a casting product (centrifugal casting blank 1) in titanium aluminide (TiAl) is obtained which includes two runners 2 and several pairs of feeders 3 with blades including an airfoil 4 and platform 5 (blade root structure) adhering to each pair of feeders. The runners 2 are now severed between the platforms 5 of adjacent blades, thus providing the workpiece 8 (blade blank) shown in FIG. 2, with feeders 3 originating at two runner portions 6 which, together, form an auxiliary clamping structure 7 connecting to the blade platform 5 to be machined. In the following operation, the workpiece 8 is spatially positioned on supporting points 9 in a precisely defined position. These supporting points correspond to six reference points 9 (see FIG. 2) specified on the airfoil 4 for the subsequent machining of the blade root structure (blade root and platform). In this position, the workpiece 8 is supported on a longitudinal side of the platform 5 initially from beneath, with the supporting element 10 being moveably located (rockered) such that it can make full-area contact with the platform 5, and is subsequently fixed with a clamping element 11 acting on the opposite longitudinal side of the platform 5. In this fixed position, the two runner portions 6 will be machined at the side which is bottom in relation to the platform 5 or the airfoil, respectively, to produce flat runner clamping surfaces 12 (aligning surfaces). In the subsequent operation, a conical recess 13 and a threaded hole 14 originating at the conical recess 13 are each produced in these runner clamping surfaces 12—still in the position fixed by the reference points 9. In this form, the feeders and runners remaining on the workpiece 8 provide an auxiliary clamping structure for clamping the workpiece 8 to a workpiece carrier 15.

Via the runner clamping surfaces with conical recess and threaded hole, the workpiece 8 is subsequently clamped to a clamping surface 16 of a workpiece carrier 15 in the position exactly corresponding to the supporting points 9 (reference points 9 for machining), enabling the platform and the blade root now to be finish-machined with maximum dimensional accuracy on the basis of the reference points 9. In the workpiece carrier 15, two taper centering sleeves 18 are moveably disposed at the distance of, and dimensioned in accordance with, the conical recesses 13 and flexibly supported by a helical compression spring 17 and held at a stop 23, with the cylindrical portion 19 of the taper centering sleeves 18 being guided in the workpiece carrier 15 and with the conical portion 20 of the taper centering sleeves 18 protruding beyond the clamping surface 16 of the workpiece carrier 15 to engage the respective conical recess 13 in the runner clamping surface 12, thus accurately positioning the workpiece 8 in accordance with its reference points 9 by means of a taper fit 13, 18 for the subsequent machining process. Since the two cones flexibly engage each other only minimum restrictions on tolerance need to be imposed.

The workpiece 8 is clamped by two clamping bolts 21 fitted to the workpiece carrier 15 and passing through the taper centering sleeves 18 whose threaded portion 22 engages the threaded hole 14 in the workpiece 8 to clamp the workpiece 8 securely to the clamping surface 16 of the workpiece carrier, thus enabling the workpiece to be machined to the extent possible on the basis of the reference points 9. Upon completion of all machining operations possible in this clamping position, the auxiliary clamping structure 7, consisting of the two feeders 3 and the correspondingly machined runner portions 6, is severed from the workpiece 8 and the blade root structure finish machined. A plurality of clamping elements can be disposed in the workpiece carrier 15, each consisting of spring-loaded taper centering sleeves 18 and clamping bolts 21, to enable successive automated machining of a maximum number of workpieces 8 (blade blanks).

LIST OF REFERENCE NUMERALS

1 Centrifugal casting blank
2 Runner
3 Feeder
4 Airfoil
5 Platform (blade root structure)
6 Runner portion
7 Auxiliary clamping structure (from 6, 3)
8 Workpiece (blade blank)
9 Supporting points, reference points, K points
10 Supporting element
11 Clamping element
12 Runner clamping surface
13 Conical recess
14 Threaded hole
15 Workpiece carrier
16 Clamping surface of 15,
17 Helical compression spring
18 Taper cantering sleeves
19 Cylindrical portion of 18
20 Conical portion of 18
21 Clamping bolts
22 Threaded portion of 21
23 Stop

What is claimed is:

1. A method for the finish machining of blade root structure of gas-turbine engine blades east in a brittle, light material, the structure including an airfoil and a platform, which upon removal from a casting mold is connected to a casting structure of feeders and runners, comprising:

positioning the blade airfoil via reference points defined for subsequent machining and clamping the blade in this defined position, while the blade is in this defined position, producing a runner clamping surface on runner portions remaining on the platform of the blade and also producing conical recesses, and threaded holes originating at these conical recesses, into the runner portions from the runner clamping surface to form an auxiliary clamping structure, subsequently fixing the blade to a workpiece carrier via the clamping structure, the workpiece carrier position the blade via a flexible taper fit with the conical recesses and clamping the blade via an engagement with the threaded holes, machining a blade root structure while the blade is fixed to the workpiece carrier, and severing the auxiliary clamping structure from the machined blade.

2. A system for the positioning, fixing and clamping for finish machining of a gas-turbine engine blade cast in a brittle, light material, the blade including an airfoil and a platform, which upon removal from a casting mold is connected to a casting structure of feeders and runners, comprising:

a locating arrangement for supporting the blade airfoil at defined supporting points corresponding to reference points for the machining of the blade root structure, and a clamping arrangement acting on longitudinal sides of the platform for fixation of the blade so as to machine an auxiliary clamping structure from runner portions remaining on the platform of the blade, the auxiliary clamping structure including a runner clamping surface on the runner portions and conical recesses, and threaded holes originating at these conical recesses, extending into the runner portions from the runner clamping surface, the auxiliary clamping structure severable from the blade after finish machining of the blade, and a workpiece carrier, clamping bolts for engaging the threaded holes following the conical recesses and clamping the blade with respect to the workpiece carrier, and spring-loaded and tapered centering sleeves positioned on the clamping bolts for engaging the conical recesses in a flexible taper fit and positioning the blade with respect to the workpiece carrier so that the blade can be finished machined upon clamping to the workpiece carrier.

3. A system in accordance with claim 2, wherein the locating arrangement includes adjustable individual supports, each provided with a spherical locating face.

4. A system in accordance with claim 2, wherein the clamping device comprises a rockered supporting element for positionally conformal support of one longitudinal side of the platform and an adjustable clamping element acting on an other side of the platform.

5. A system in accordance with claim 2, and further comprising helical compression springs, the workpiece carrier including cylindrical portions and stops, wherein the moveable taper centering sleeves rest on the helical compression springs, are respectively guided by the cylindrical portions and held at the stops in the workpiece carrier, with the conical portions of the taper centering sleeves protruding beyond the clamping surface of the workpiece carrier.

6. A system in accordance with claim 2, comprising at least two taper centering sleeves and clamping bolts which each correspond with the auxiliary clamping structure of the workpiece.

7. A system in accordance with claim 2, wherein the workpiece carrier includes an auxiliary clamping structure for clamping a plurality of workpieces.

8. A method in accordance with claim 1, wherein the brittle, light material is titanium aluminide.

9. A system in accordance with claim 5, comprising at least two taper centering sleeves and clamping bolts which each correspond with the auxiliary clamping structure of the workpiece.

10. A system in accordance with claim 9, wherein the workpiece carrier includes an auxiliary clamping structure for clamping a plurality of workpieces.

11. A system in accordance with claim 10, wherein the locating arrangement includes adjustable individual supports, each provided with a spherical locating face.

12. A system in accordance with claim 10, wherein the clamping device comprises a rockered supporting element for positional conformal support of one longitudinal side of the platform and an adjustable clamping element acting on an other side of the platform.

\* \* \* \* \*